Jan. 17, 1967    E. P. AGHNIDES    3,298,614
MOLDED WATER AERATORS
Filed May 17, 1965
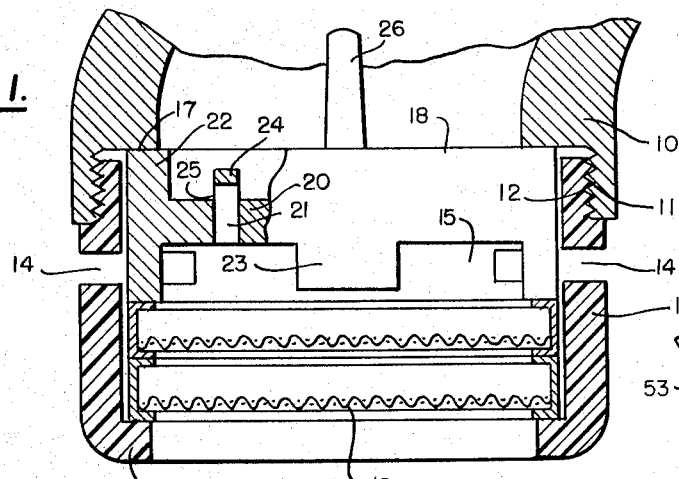
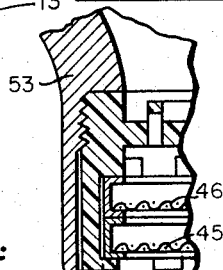
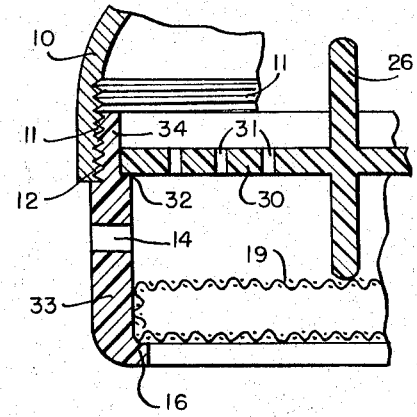
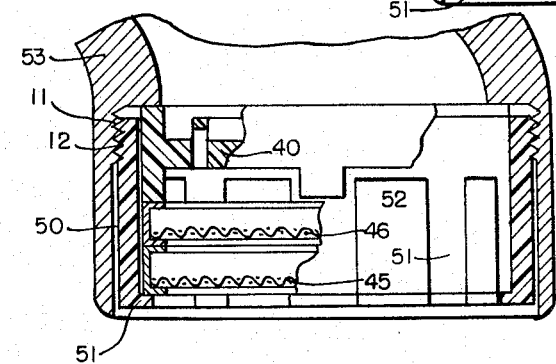
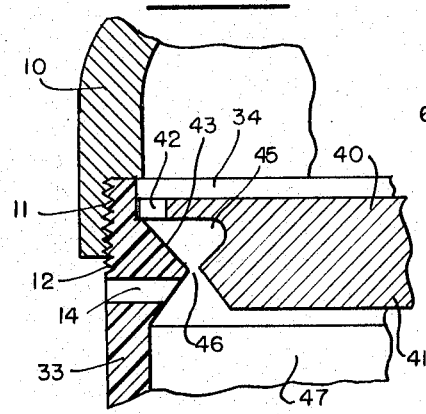
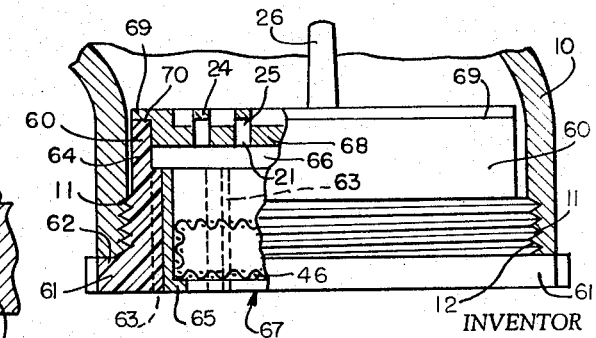
INVENTOR
Elie P. Aghnides
BY Moore & Hall
ATTORNEYS United States Patent Office 3,298,614
Patented Jan. 17, 1967

1

3,298,614
MOLDED WATER AERATORS
Elie P. Aghnides, 745 5th Ave., New York, N.Y. 10021
Filed May 17, 1965, Ser. No. 470,282
11 Claims. (Cl. 239—428.5)

Reference is made to my prior application Serial No. 337,501 filed February 18, 1953 for Faucet Attachments, now abandoned, and to my application Serial No. 65,129 filed October 26, 1960 for Expendable Aerators, copending with Serial No. 337,501, of which applications this application is a continuation-in-part, in which are disclosed metal aerators having a male and female threaded portion in plastic material.

The present invention concerns a novel water aerator which is constructed to be molded from plastic materials.

It is an object of the invention to provide a male areator with a practical molded casing which may be water-tight, but removably connected with the diaphragm.

It is an object of the invention to provide a male threaded molded aerator body which may be screwed in a leak-proof manner to a female threaded spout without the provision of a sealing shoulder at the upstream end of its threads.

It is an object of the invention to provide a molded plastic aerator body with unframed screens in said body.

It is an object of the invention to provide a molded unitary aerator mounted substantially entirely within the faucet where it is protected and can be safely constructed with thinner walls and a saving in plastic material and an increased volume in the mixing chamber to provide improved aeration to produce a bubbly stream.

It is an object of the invention to provide a molded water aerator with a round, tubular, plastic body having compressible threads which may be threaded into a metal faucet under compression to assure a firm permanent installation which will last the life of the aerator if desired.

It is an object of the invention to provide molded plastic unitary water aerators with outside threads which permit decreased wall thickness and the use of a jet-forming diaphragm as a reinforcing structural member so the molded threads can be forced against the internal metal faucet threads by the combined action of the aerator structure and the line water pressure.

It is an object of the invention to provide molded plastic water aerators having compressible threads which may be screwed to a faucet and removed by hand, permitting instant cleaning and replacement at all times without the use of pliers which would damage or destroy the aerator.

It is an object of the invention to provide external threads on molded plastic aerators requiring only a relatively small wall thickness and/or a fine threading to enable the surrounding metal faucet slightly to compress the threads of the aerator and to hold the latter firmly in their grip with the line water pressure and/or the internal structure of the aerator serving as means of reinforcement on the inner side of the part of the casing wall bearing the compressible threads. This construction enables the weak connection provided by a relatively thin and/or finely threaded plastic material to withstand water pressure when attached to the spout and treating the water issuing therefrom.

It is an object of the invention to provide plastic water aerators having a male thread adjacent the downstream end thereof and constructed to be securely attached to a faucet in which the female thread extends to the downstream end thereof. This construction enables the plastic aerator to be inserted within the spout and securely screwed to the faucet, whether the aerator is entirely within the faucet or projects therefrom.

It has been the practice heretofore to have aerators installed by a plumber who uses a wrench or pair of pliers to tighten them to provide a leak-proof fit because of the back pressure. This applied particularly to those male threaded aerators which are only a half inch long. As a result, their removal is usually so difficult that a housewife, unable readily to remove the aerator, must often be contented with a clogged and ineffective aerator delivering a flow of water poorly aerated and reduced in volume by impurities and calcium deposits.

I have found that if the threaded portion of an aerator is in yieldable plastic material anyone can screw the short male threaded aerator into a spout and remove it by hand.

I have found that threaded aerators made in yieldable plastic material will effect a leak-proof sealing when installed by hand. If pliers are used to install such an aerator, care must be exercised to prevent damage to the aerator structure.

I have further found that prior art male threaded aerators cannot be used to equip the mass-produced tubular faucet spout in common use as such spouts have walls which are often too thin to permit the forming of a sealing shoulder therein by a tool which cuts into the metal of the wall of the spout. It is accordingly an object of the present invention to provide a plastic aerator which can be fitted to such spouts and screwed tight by hand to produce a water-tight joint without expensive prior fitting with a cutting tool to provide an internal sealing shoulder within the faucet.

The application of this concept to all plastic molded aerators with male threads provides new and useful advantages. Aerator threads are generally standard in all countries as are pipe threads. A molded plastic aerator with male threads can be made with a thinner wall than an aerator with female threads because it receives support from the surrounding metal of the faucet which compresses the threads which are further reinforced by the inner structure of the aerator. This construction both saves material and improves aeration because of the larger mixing chamber made possible by the thinner wall structure.

In the drawings, like numerals refer to like parts throughout.

FIGURE 1 is a vertical section of one form of molded water aerator according to the invention.

FIGURE 2 is a fragmentary section of a modification of FIGURE 1.

FIGURE 3 is a fragmentary section of another modification of invention providing a molded structure with a novel jet-forming and air-mixing diaphragm.

FIGURE 4 is an elevation partially in section of another form of molded water aerator in which line pressure is employed to seal the molded threads in leak-proof relation to the faucet; with the aerator wholly housed therein.

FIGURE 4A illustrates a modification of the embodiment of FIGURE 4 wherein the diaphragm is formed integrally with the housing which is inserted within the discharge end of the faucet.

FIGURE 5 is an elevation partially in section of a molded unitary aerator structure with stiffening ribs providing air channels and bottom threads and sealing flange for mounting the aerator within the faucet.

Faucet or spout 10 is internally threaded at 11 to receive the molded threads 12 of body member or casing 13 of an aerator molded of plastic material, rubber or the like. Casing 13 is slotted at 14 on opposite sides adjacent molded threads 12 to provide for the entrance of ambient air into a mixing chamber 15 within casing 13.

The outlet end of casing 13 is provided with an inwardly extending flange 16 which cooperates with internal shoulder 13 of faucet 10 to hold mixing disc 18 and screens 19 firmly therebetween. Mixing disc 18 comprises a jet-forming diaphragm 20 with jet passage 21, an upper annular rim 22 bearing against shoulder 17 and downwardly extending feet 23 resting upon the edge of the upper one of screen 19. The lower screen 19 rests upon flange 16. Feet or lugs 23 space the jet diaphragm 20 from screens 19 to form mixing chamber 15. Ambient air passes through slots 14 and the spaces between lugs 23 into chamber 15 where it is mixed with the jets produced by jet passages 21. Jet passages 21 are formed under annular ribs 24 by a plurality of horizontal channels 25, connecting jet passages 23 with the upper stream side of diaphragm 20.

It will be noted that this construction provides the turbulent admixture of air and water into a coherent bubbly stream characteristic of Aghnides aerators. The only metal present is in the screens 19 and the casing 13 may be molded integrally with or separately from the diaphragms 20. Where the diaphragm 20 is integral, the screens 19 are forced past deformable flange 16 which is resilient and holds the screens firmly against lugs 23 which take the form of integral shoulders extending from the inner wall of casing 13. Slotting 14 may be done by a routing tool which is moved around the periphery of casing 13 far enough to provide adequate openings for the admission of air to mixing chamber 15 without removing lugs 23. If desired, suitable holes may be drilled through the wall of casing 13 to perform the function of slots 14. The plastic threads 12 are compressed in sealing relation against metal threads 11 which in some cases cut the final contour of threads 12 to form a firm, tight joint. Where the diaphragm 20 is separate from casing 13, it may be constructed as shown in FIGURE 1 to stress the entire casing 13 by the compressive action of shoulder 17 and internal flange 16 and place an additional force on plastic threads 12, helping to increase sealing action in some constructions. Although shown with a small clearance between casing 13 and diaphragm 20 in FIGURE 1, it will be understood that this may be eliminated and the diaphragm 20 inserted with a friction or even force fit which is sufficient to maintain the relationship of the assembled parts 13, 19 and 20 at all times, so that a unitary structure is provided which may be handled by projection or handle 26 molded integrally with diaphragm 20.

In FIGURE 2 the diaphragm 30 is a plane disc with jet-forming holes 31 and a handle 26. Removable diaphragm 30 bears with friction fit against an integral internal shoulder 32 of casing 33 which is located below the threads 12 and outside of the faucet 10. This construction provides an inner wall area 34 opposite the threads 12 which are under compression from the tight fit with metal threads 11 and helps to prevent leakage at the periphery of the diaphragm. Wall area 34 is thinner than the remainder of casing 33 and the line pressure within faucet 10 acting on area 34 is able to exert a substantial force which aids in effecting a watertight seal. The leakproof connection effected by the friction fit of removable diaphragm 30, with or without the support of metal threads 11 of faucet 10, permits the attachment and use of the aerator of the present invention with inexpensive thin-walled faucets of existing installations, having no ledge to overlap or to seat the customary washer to effect the required sealing. Reference is made in this connection to my copending application Serial No. 65,129 in which the plastic aerator casing and the diaphragm are integral, so that the aerator may be fitted to all faucets, whether provided with a sealing ledge or not.

FIGURE 3 shows a molded plastic water aerator for insertion into a metal faucet 10 wherein the diaphragm 40 is shown molded as a thick plug having a depending part 41 and positioned adjacent the base of inner wall area 34, but within the faucet 10 opposite the lower end of threads 11 and 12 where it acts as a reinforcing member to increase the sealing force as the threads 11 compress the threads 12 and the plastic material behind them which forms the wall 34 and the diaphragm 40.

Diaphragm 40 has peripheral stream-forming openings 42 which direct stream flow onto inclined annular surface 43 which breaks the streams up in small annular chamber 45, extending into the body 41 of diaphragm 40. A narrow annular nozzle opening 46 directs the broken streamlets into mixing chamber 47, air being drawn in through opening 14 as the water moves by at high velocity.

The structure of FIGURE 3 provides a preferred form of molded water aerator with a simple structure requiring the single assembly operation of the insertion of screens 46 with or without framing members 45 of the type shown in FIGURE 4. This is a practical device with cost and labor approaching a minimum.

In FIGURE 4 the structure is modified so that it fits entirely within a faucet 53 where it is protected. The molded plastic housing 50 is suspended from threads 12 which are sufficiently compressed by mating faucet threads 11 that there is no danger of dislodgement because of water flow. Housing 50 comprises a smooth cylindrical wall lying entirely within faucet 53. Ribs 51 extend from the bottom of diaphragm 40 to framing 45 of screens 46 as shown. This extension of ribs 51 permits the use of a thinner wall for casing or housing 50 than is possible in the construction of the previous figures where the casings or housings extend outside the faucet 10 and are subject to forces other than water flow and assembly compression. Not only does the construction of FIGURE 4 use less molded material with the resulting reduction in cost, but it provides a larger mixing chamber and improved aeration for many applications. The entire outer wall of 50 and the corresponding part of faucet 53 can be threaded to establish sealing contact and firm mounting. This construction permits the use of this internal aerator in most present-day female threaded faucets with only a little additional threadings.

A U-shaped key (not shown) may be used to install the present aerator within a faucet. The upstanding arms of the U enter, for example, the space between lugs 52 which support framing 45 and act against the ribs 52 to cause the aerator to be threaded into installed position. The diaphragm 40 need not be integral with the housing 50.

In FIGURE 5 is shown a modification of a completely housed molded water aerator as in FIGURE 4 which may be installed in standard threaded faucet 10. Housing or casing 60 is preferably provided with an outer end flanging 61 which fits flush with the outlet end 62 of faucet 10 when threads 11 and 12 are in firm engagement. This construction provides a neat leakproof assembly with substantially the entire molded aerator assembly extending upwardly within the faucet 10 where it is protected and can function normally free from distorting bumps. Plastic threads 12 are located just above flange 61 and faucet end 62 where the body of casing 60 is reinforced by vertical ribs 63 spaced around its inner cylindrical surface. Ribs 63 are compressed by the insertion of a flanged ferrule 64 which they grip firmly and anchor against displacement by water flow. Ferrule 64 preferably has a diameter to provide a force fit into casing 60 and to supply a backing force to and in the compression of threads 12 within faucet 10 and against threads 11 thereof. Flange 65 strengthens the assembly and serves to support screens 46 below an enlarged mixing chamber 66 to which air is supplied from the outlet end of the aerator through the spaces 67 between vertical ribs 63. A jet-forming diaphragm 68 is provided with a positioning flange 69 which overlies the upstream end of casing 60 with which it has a press-fit water-proof engagement at 70 which also permits the assembled molded aerator to be handled as a unit by handle 26. Although ribs 63 are shown as being of the same height as flanged ferrule 64 to maximize the effective volume of mixing chamber 66 and minimize the amount of plastic material employed, they may be extended upwardly to the bottom of diaphragm 68 to increase the stiffness of the upstream end of casing 60 and its gripping action on the inserted portion of diaphragm 68. Here, again, diaphragm 68 may be molded integrally with housing or casing 60 without interfering with the insertion of ferrule 64 and screening 46 into engagement with ribs 63.

The flanging 61 enables the aerator of FIGURE 5 to be inserted by hand. If desired, a U-shaped key may be used as discussed above and the flange 61 eliminated. The casing 60, if threaded to fit tightly, will be securely held within the spout end of faucet 10 without danger of leakage between threads 11 and 12. Under these circumstances the plastic threads 12 are slightly compressed by the metal threads 11 and in effect supply their own packing.

It will be understood that although the screens 19 in FIGURE 1 require framing, the screens in the other figures of the drawing do not require such treatment. The lugs 42, 51 and 63 may be provided with inturned integral foot elements corresponding to flange 16 to hold the screens in position. Such foot elements would yield sufficiently to permit insertion of the screens. Where screen elements such as 46 are used without framing and the ferrules 45 and 64 are eliminated, the vertical sides of resilient plastic lugs 42, 51 and 63 may be provided with toothed indentations resembling threads 12, which will fit into the screen interstices along the vertical side portions of screen elements 46 to anchor them in place.

The construction shown in FIGURE 4, relating to an aerator with slots in the side walls and in FIGURE 5, relating to an aerator with an air intake at its downstream end, both structures being threaded within the spout end of faucet 10, are improvements on my copending application Serial No. 65,129 filed October 26, 1960, which is a continuation-in-part of Serial No. 746,539, and Serial No. 752,459, now abandoned, which show complete threaded aerators screwed within the spout end of a faucet.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim:

1. In a molded water aerator, a yieldable plastic body member having a thin cylindrical shell with integral external threads thereon of a diameter and size such that at least that part of the cylindrical shell having said integral threads is under substantial compression when the aerator is threaded into a metal faucet, a transverse jet-forming internal diaphragm in said body adjacent said external threads and having an outer diameter substantially equal to the inner diameter of said shell at the location of said diaphragm to provide thereby an inner support for said thin cylindrical shell when under compression from the faucet threads, screen means in said body member adjacent its downstream outlet, said body member being constructed to provide a channel for the supply of ambient air to said mixing chamber.

2. The water aerator of claim 1 in which said diaphragm is of plastic material and is integral with said cylindrical shell.

3. The combination set forth in claim 1, said body member being so constructed that at least the major part thereof fits within the outlet end of a faucet whereby the aerator assembly is protected and wall thickness may be reduced to a minimum and the internal volume available for water flow and aeration is increased to maximize the volume of properly aerated water capable of flowing from said aerator in a coherent bubbly stream.

4. The combination set forth in claim 1, said diaphragm being positioned opposite downstream threads of said integrally molded external threads whereby to exert an opposing force to the compression of said downstream threads when under compression by a faucet in which the aerator assembly is installed and to provide an inner wall area opposite the upstream threads immediately above said diaphragm to cause line water pressure to provide a similar opposing force to the compression of said upstream threads to provide a more effective seal between the aerator and the faucet and to increase the resultant effective force anchoring the aerator assembly in installed position within a faucet.

5. In a molded water aerator, a body member of yieldable plastic material and having a thin cylindrical shell with integral external threads thereon adjacent its inlet end of a diameter and size such that at least that part of the cylindrical shell having said integral threads is under substantial compression when the aerator is threaded into a metal faucet, a transverse jet-forming internal diaphragm carried by said body member adjacent its upstream inlet and having an outer diameter relative to the inner diameter of said shell at the location of said diaphragm such that said diaphragm can act as a force absorbing member when said shell is under compression, mixing means downstream the jet-forming internal diaphragm for finely breaking up the water from said diaphragm and mixing it with air to form a coherent stream of water laden with numerous small bubbles, said body member being constructed to provide a channel for the supply of ambient air to said mixing chamber.

6. The combination set forth in claim 5, said body member being so constructed that at least the major part thereof fits within the outlet end of a faucet whereby the aerator assembly is protected and wall thickness may be reduced to a minimum and the internal volume available for water flow and aeration is increased to maximize the volume of properly aerated water capable of flowing from said aerator in a coherent bubbly stream.

7. The water aerator of claim 5 in which said diaphragm is integral with said shell.

8. The combination set forth in claim 5, said diaphragm being positioned substantially opposite the downstream end of said integrally molded external threads whereby to exert an opposing force to the compression of said downstream threads when under compression by a faucet in which the aerator assembly is installed and to provide an inner wall area opposite the upstream threads immediately above said diaphragm to cause line water pressure to provide a similar opposing force to the compression of said upstream threads to provide a more effective seal between the aerator and the faucet and to increase the resultant effective force anchoring the aerator assembly in installed position within a faucet.

9. In a molded water aerator as defined in claim 5, said body member having inturned means at its lower end, said mixing means resting on said inturned means, said diaphragm resting on said mixing means and including an upwardly extending projection for engagement with an internal ledge in the faucet.

10. In a molded water aerator as defined in claim 9, said body member being within the faucet and having its threads at its upper end for engagement with threads in the faucet, the outside porton of the body member downstream the threads being smaller than the inside diameter of the faucet to form an air channel, the body member having openings to allow air to enter above the mixing means and below said diaphragm.

11. In a molded water aerator as defined in claim 5, said body member being within the faucet and having its threads at its upper end for engagement with threads in the faucet, the outside portion of the body member downstream the threads being smaller than the inside diameter of the faucet to form an air channel, the body member having openings to allow air to enter above the mixing means and below said diaphragm.

References Cited by the Examiner

UNITED STATES PATENTS

| | | | |
|---|---|---|---|
| 2,664,278 | 12/1953 | Aghnides | 239—428.5 |
| 2,799,487 | 7/1957 | Aghnides | 239—428.5 |
| 2,842,347 | 7/1958 | Ripley | 239—428.5 |
| 2,888,209 | 5/1959 | Hjulian | 239—428.5 |
| 2,989,249 | 6/1961 | Richter | 239—428.5 |
| 2,998,926 | 9/1961 | Aghnides | 239—428.5 |
| 2,998,929 | 9/1961 | Aghnides | 239—428.5 |
| 2,998,931 | 9/1961 | Aghnides | 239—428.5 |
| 3,010,659 | 11/1961 | Goodrie et al. | 239—428.5 |
| 3,014,667 | 12/1961 | McLean et al. | 239—428.5 |

EVERETT W. KIRBY, *Primary Examiner.*